W. P. SHIPMAN.
WELDING APPARATUS.
APPLICATION FILED DEC. 20, 1920.

1,403,648.

Patented Jan. 17, 1922.
2 SHEETS—SHEET 1.

INVENTOR.
Wm. P. Shipman

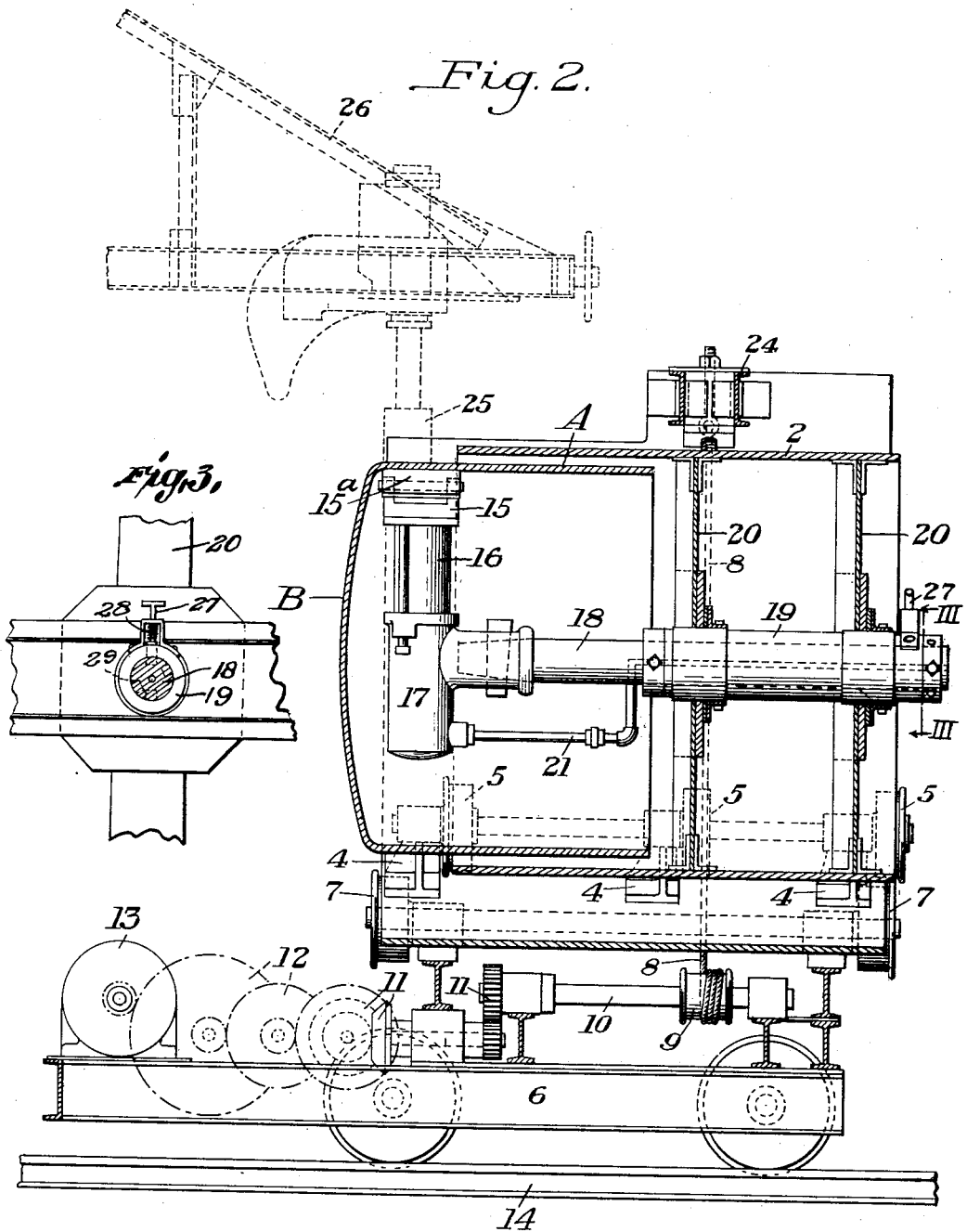

UNITED STATES PATENT OFFICE.

WILLIAM P. SHIPMAN, OF PITTSBURGH, PENNSYLVANIA, ASSIGNOR TO BLAW-KNOX COMPANY, OF PITTSBURGH, PENNSYLVANIA, A CORPORATION OF NEW JERSEY.

WELDING APPARATUS.

1,403,648.   Specification of Letters Patent.   Patented Jan. 17, 1922.

Application filed December 20, 1920. Serial No. 431,888.

*To all whom it may concern:*

Be it known that I, WILLIAM P. SHIPMAN, residing at Pittsburgh, Allegheny County, Pennsylvania, have invented a new and useful Improvement in Welding Apparatus, of which the following is a full, clear, and exact description, reference being had to the accompanying drawings, forming part of this specification, in which:—

Figure 2 is a longitudinal vertical section of the same, some of the parts being shown in dotted lines in both figures; and Figure 3 is a transverse sectional view on the line III—III of Figure 2 looking in the direction of the arrow.

Figure 1:
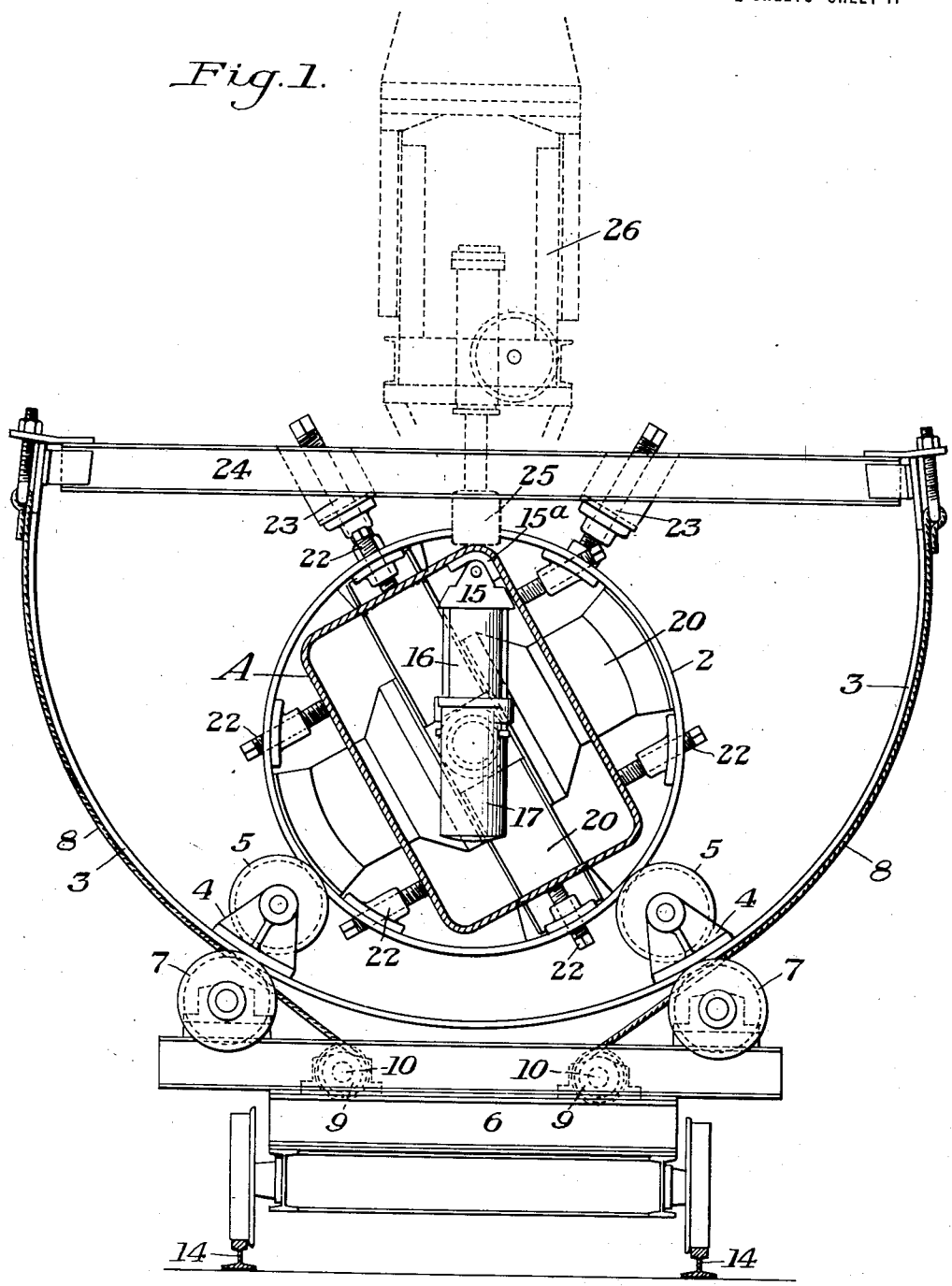
Figure 1 is a tranverse vertical section of a preferred form of apparatus embodying my invention.

My invention has relation to welding apparatus, and more particularly, to apparatus for welding the corner portions of sheet metal boxes, the object of the invention being to provide a simple and efficient machine for the purpose.

The invention is applicable to various forms of boxes, but has been particularly designed for welding tops to the body portions of sheet metal annealing boxes, such as are used in sheet and tin plate mills. Such boxes are usually formed with rounded corners and the operation of making welds at these corners has been an exceedingly difficult one, prior to my invention, owing to the lack of any suitable apparatus for holding and manipulating the parts being welded.

The particular nature of my invention will be best understood by reference to the accompanying drawings, in which I have shown a preferred embodiment, and which will now be described, it being premised, however, that various changes can be made in the details of construction, arrangement and combination of the several parts, without departing from the spirit and scope of my invention as defined in the appended claims.

In these drawings, the numeral 2 designates a work holder, which is in the form of a cylindrical shell open at its ends. This shell is mounted for rotary movement within a support 3. In the construction shown, the support 3 is of semicylindrical form, with its open side upward, and has secured to its lower interior portion suitable brackets 4, in which rollers 5 are journaled. These rollers form the mounting for the work holder 2. The shell 3 is, in turn, preferably mounted for rotary movement upon a suitable support, which is preferably in the form of a movable truck 6, provided with the wheels or rollers 7, upon which the support 3 is seated, and upon which it may be moved. This movement may be effected by any suitable means. In the drawing, I have shown the two ropes or cables 8, connected to the upper portion of the support 3, at opposite sides thereof, and extending downwardly with their opposite end portions wound upon drums 9, mounted upon the shafts 10, which are journaled in the frame of the truck 6. The shafts 10 may be actuated by any suitable means for winding and unwinding the ropes or cables 8. For instance, they may be suitably geared, as indicated at 11 in Figure 2, to the train of gearing 12, driven by an electric motor 13, and used to propel the truck 6 along the track 14.

15 designates an anvil which is carried on the outer end of a plunger 16, which works within a power cylinder 17. This power cylinder is rigidly secured to the end portion of a carrier 18, which is mounted for rotation within a sleeve 19, forming the hub of the work support 2 and connected with the shell of said support by the radial members 20. The cylinder 17 is provided with suitable connections 21, through which actuating fluid may be admitted. The anvil face of the anvil 15 is preferably formed by a pivoted member 15$^a$, of the proper shape to adapt itself to the interior surfaces of the corners to be welded, as shown in Figure 1. This is preferably made readily removable, so that different shaped anvil members may be used interchangeably to suit the particular work being done. It will be readily seen that the anvil can be moved radially by means of the cylinder 17.

A designates the body portion and B the top portion of an annealing box, which is shown in position to have one of its corners welded. This has its open end portion inserted within the open outer end of the shell of the work holder 2, and is secured within said holder by means of a plurality of clamping devices 22, of any suitable character, the anvil being adjusted so that the member 15ᵃ will fit within the corner to be welded. The work holder 2 is clamped in the proper position in the support 3 by means of suitable clamping members 23, seated on a cross beam 24, extending across the open top of the support 3.

The portion of the metal to be welded may be heated by means of any suitable or usual flame, preferably a water-gas flame. The welding is effected by the operations of a suitable power hammer, such as indicated at 25, this hammer being carried by any suitable overhead or overhanging support, such as that indicated at 26 in dotted lines. Power hammers suitable for this purpose are well known in the art and form no part of the present invention. During the welding of a corner, the holder 2 is rotated to bring all portions of the corner to the action of the hammer. When one corner has been welded, the clamping devices 23 are released and holder 2 turned a sufficient distance to bring the nearest adjacent corner into welding position. The pawl 27 is then released from the carrier 18 by pulling it outwardly against the action of its retaining spring 28, out of one of the openings 29 in the carrier, and the carrier 18 is turned to bring the anvil back to position under the hammer. Thereafter the pawl engages another of the openings 29 so located as to hold the anvil in its proper position. After this corner has been welded, the holder 2 is rotated to bring one of the corners at the opposite end portion into welding position.

The advantages of my invention will be apparent to those familiar with the difficulty of making corner welds in boxes, more particularly with large boxes and other receptacles, such as annealing boxes, galvanizing boxes, etc. The parts to be welded can be readily clamped in the work holder, and thereafter, the operator has perfect control of the work by manipulation either of the support 3 or of the holder 2, or of both. He also has perfect control of the anvil and can adjust the same as may be necessary from time to time.

I claim:

1. Welding apparatus, comprising a work holder mounted for rotary movement, and an anvil mounted in said holder, substantially as described.

2. Welding apparatus, comprising a work holder mounted for rotary movement, and an anvil rotatably mounted in said holder, substantially as described.

3. Welding apparatus, comprising a work holder mounted for rotary movement, and an anvil mounted in said holder for adjustment in a direction at substantially right angles to the longitudinal axis of the holder, substantially as described.

4. Welding apparatus, comprising a work holder mounted for rotary movement, and an anvil rotatably mounted in said holder and also mounted for adjustment in a direction at substantially right angles to such axis, substantially as described.

5. Welding apparatus, comprising a work holder mounted for rotary movement, and an anvil mounted in said holder, said anvil having a pivoted die member forming its anvil surface, substantially as described.

6. Welding apparatus, comprising a work holder having an anvil, and a support in which said holder is rotatably mounted, said support being also mounted for rotary movement about the axis of the holder, substantially as described.

7. Welding apparatus, comprising a movable truck, a support mounted for rotary movement on said truck, a work holder mounted for rotary movement on said support, and an anvil mounted within said holder, substantially as described.

8. Welding apparatus, comprising a movable truck, a support mounted for rotary movement on said truck, a work holder mounted for rotary movement on said support, and an anvil mounted within said holder, together with means for securing the holder in different adjusted positions on the support, substantially as described.

9. Welding apparatus, comprising a rotatable cylindrical work holder having an open end portion through which the work can be introduced, means for clamping the work in said holder, and an anvil mounted in said holder, substantially as described.

10. Welding apparatus, comprising a rotatable cylindrical work holder having an open end portion through which the work can be introduced, means for clamping the work in said holder, and an anvil mounted in said holder, said anvil being adjustable in the direction of the longitudinal axis of the holder and also at substantially right angles to such axis, substantially as described.

11. Welding apparatus, comprising a cylindrical work holder having an open end portion through which the work can be introduced, means for clamping the work in said holder, and an anvil mounted in said holder, together with a support on which said holder is rotatably mounted, substantially as described.

12. Welding apparatus, comprising a cylindrical work holder having an open end portion through which the work can be introduced, means for clamping the work in said holder, an anvil mounted in said holder, together with a support on which said holder is rotatably mounted, and a carrier upon which the support is rotatably mounted, substantially as described.

13. Welding apparatus, comprising a cylindrical shell having devices for clamping the work therein and also having a hub, a carrier rotatably mounted in said hub, and an anvil carried by said carrier, substantially as described.

14. Welding apparatus, comprising a work holder in the form of a cylindrical shell having an open end, a sleeve forming the hub of said shell, a carrier mounted in said sleeve, and a cylinder attached to said carrier and having its axis at substantially right angles to the axis of the shell, a plunger in the said cylinder, and an anvil carried by the said plunger, substantially as described.

In testimony whereof, I have hereunto set my hand.

WILLIAM P. SHIPMAN.